United States Patent
Rudd

(10) Patent No.: US 6,320,191 B1
(45) Date of Patent: Nov. 20, 2001

(54) DISPERSIVE PRECOMPENSATOR FOR USE IN AN ELECTROMAGNETIC RADIATION GENERATION AND DETECTION SYSTEM

(75) Inventor: James V. Rudd, Ann Arbor, MI (US)

(73) Assignee: Picometrix, Inc., Ann Arbor, MI (US)

(*) Notice: Subject to any disclaimer, the term of this patent is extended or adjusted under 35 U.S.C. 154(b) by 0 days.

(21) Appl. No.: 09/257,421

(22) Filed: Feb. 25, 1999

Related U.S. Application Data
(60) Provisional application No. 60/079,590, filed on Mar. 27, 1998.

(51) Int. Cl.[7] .............................. G02B 6/26; G08C 23/06
(52) U.S. Cl. ........................................ 250/341.1; 250/330
(58) Field of Search ................................ 250/330, 341.1

(56) References Cited

U.S. PATENT DOCUMENTS

| | | |
|---|---|---|
| 4,913,520 | 4/1990 | Kafka . |
| 4,918,751 | 4/1990 | Pessot et al. . |
| 4,922,091 | 5/1990 | Grischkowsky . |
| 4,972,069 | 11/1990 | Grischkowsky . |
| 5,056,111 | 10/1991 | Duling, III et al. . |
| 5,101,456 | 3/1992 | Islam . |
| 5,150,248 | 9/1992 | Alfano et al. . |
| 5,373,381 | 12/1994 | Alfano et al. . |
| 5,373,382 | 12/1994 | Pirio et al. . |
| 5,430,569 | 7/1995 | Blauvelt et al. . |
| 5,463,485 | 10/1995 | Alfano et al. . |
| 5,543,960 | 8/1996 | Carrig et al. . |
| 5,623,145 | 4/1997 | Nuss . |
| 5,652,681 | 7/1997 | Chen et al. . |
| 5,689,361 | 11/1997 | Damen et al. . |
| 5,710,430 | 1/1998 | Nuss . |
| 5,729,017 | 3/1998 | Brener et al. . |

FOREIGN PATENT DOCUMENTS

606776A3   7/1994   (EP) .

Primary Examiner—Constantine Hannaher
Assistant Examiner—Andrew Israel
(74) Attorney, Agent, or Firm—Brinks Hofer Gilson & Lione

(57) ABSTRACT

An electromagnetic radiation emitter which utilizes a precompensator, pulsed light signal, optical fiber cable, and a terahertz radiation generator. The present invention incorporates an optical precompensator to correct for the stretching of an optical signal as it travels through an optical fiber cable. The dispersion characteristics of the precompensator will be equal and opposite to the dispersion characteristics of the optical fiber cable, maintaining the fidelity of optical pulses as they travel through and exit the optical fiber cable striking a device that generates terahertz electromagnetic radiation.

23 Claims, 7 Drawing Sheets

DISPERSIVE PRECOMPENSATOR FOR USE IN AN ELECTROMAGNETIC RADIATION GENERATION AND DETECTION SYSTEM

RELATED APPLICATIONS

The present application claims priority to U.S. Provisional Patent Application Serial No. 60/079,590 filed on Mar. 27, 1998.

BACKGROUND OF THE INVENTION

The present invention relates to a precompensator to correct the dispersive effects of optical fiber. More specifically the present invention relates to a terahertz electromagnetic radiation emission and detection system that utilizes a precompensator, optical fiber, and pulsed laser.

In the present invention extremely short optical pulses in the femtosecond range generated by a laser are transferred from a laser to a terahertz generator by way of an optical fiber cable. The terahertz generator is comprised of a material that, when illuminated with a short optical pulse, generates electromagnetic radiation in the terahertz range (10 GHz to 50 THz). These materials fall principally into two large categories, photoconductive terahertz generators and non-linear optical generators. In the former category the incident photons generate electrical carriers, both holes and electrons, which are then accelerated by a voltage potential within the material that is either externally applied or internally present due surface potentials in semiconductors. This charge motion in turn generates an electromagnetic field that normally consists of a single or half-cycle of radiation in the terahertz range. The second category of THz generators consists of materials that utilize non-linear optical methods to generate THz radiation. These materials have a non-linear susceptibility, $\chi^{(2)}$, $\chi^{(3)}$, or $\chi^{(4)}$ that causes the input optical pulse to generate a polarization state due to the equation:

$$P_{NL} = \chi^{(i)}(E)^i$$

Where $P_{NL}$ is the non-linear polarization state of the material, and E is the electrical field of the incident optical pulse. This method is known by a number of names to describe the various physical processes taking place. Some of the effects known to occur are, the inverse Franz-Keldysh effect, electric-field-induced optical rectification, the Stark effect, and Cherenkov radiation. This effect will heretofore be referred to as optical rectification since the scientific literature generally accepts this term to encompass all of the effects.

In order to successfully deliver high contrast, sub-100 femtosecond pulses from a laser, one must effectively control the dispersion in an optical fiber through the use of a precompensation device. Dispersion is the spreading and/or distortion of a light pulse as it travels down the length of an optical fiber. Different wavelengths or colors of light travel at different velocities through a fiber, which tends to widen an optical pulse. This phenomena result from the non-linear frequency dependence of the refractive index of silica used in optical fibers. For a more detailed description with respect to optical dispersion see Steven John Kane, "High-Order-Dispersion Control for the Amplification and Compression of Femtosecond Laser Pulses" (1997) (Ph.D. dissertation, University of Michigan (Ann Arbor)) and James VanHartness Rudd, "Advanced Techniques for the Amplification of Sub-100-femtosecond Pulses in Ti:Sapphire-Based Laser Systems" (1996) (Ph.D. dissertation, University of Michigan (Ann Arbor)).

The dispersion of light leads to a potential corruption of the terahertz signal. The problem can be corrected by precompensating the signal for any stretching caused by the material dispersion characteristics of a fiber optic cable. An optical pulse may be given dispersion characteristics that are equal and opposite to the dispersion generated by an optical fiber, allowing the exact reconstruction of a pulse as it exits the optical fiber.

The present invention is concerned with the generation of terahertz electromagnetic radiation by a pulsed laser in a commercially packaged system. In previous applications such as in a lab environment a laser can be pointed directly through space at an optical switching element with negligible dispersive effects. To allow the commercial use of such a system the present invention must be industrially hardened and packaged. A laser pulse in a room environment may be deflected by objects or people and will suffer degradation from atmospheric effects, unacceptable conditions in an industrial environment. By incorporating an optical fiber cable into the present invention, the laser light is given a predetermined path of travel and allows the present invention to be precisely aligned, ruggedly seated, and bundled into compact form. Given the need for an optical fiber cable to package the system the problem of dispersion now exists, necessitating a precompensation device to maintain the fidelity of the optical pulses traveling through the optical fiber cable.

Further objects, features and advantages of the invention will become apparent from a consideration of the following description and the appended claims when taken in connection with the accompanying drawings.

SUMMARY OF THE INVENTION

The present invention is an electromagnetic radiation emitter which utilizes a precompensator, pulsed light signal, optical fiber cable, and a photoconductive element or an element that exhibits optical rectifiction to generate high frequency electromagnetic radiation in the terahertz range. The present invention incorporates an optical precompensator to correct for the stretching of an optical signal as it travels through an optical fiber cable. The dispersion characteristics of the precompensator will be equal and opposite to the dispersion characteristics of the optical fiber cable, maintaining the fidelity of optical pulses as they travel through and exit the optical fiber cable striking a photoconductive or electro-optic element to generate terahertz electromagnetic radiation.

DETAILED DESCRIPTION OF THE PREFERRED EMBODIMENT

Figure 1:
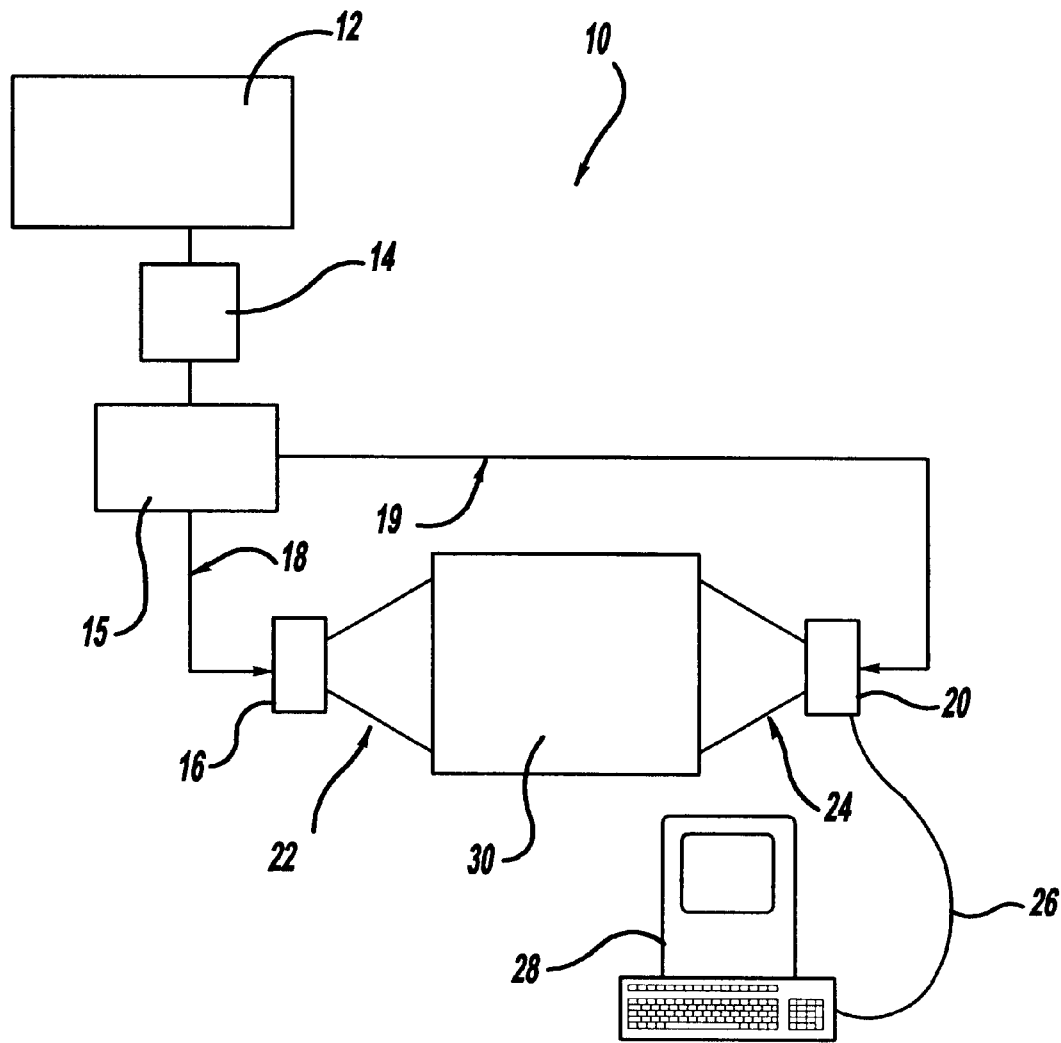
FIG. 1 is a diagrammatic view of a terahertz electromagnetic radiation emission and detection system.

FIG. 1 is a diagrammatic view of a terahertz electromagnetic radiation emission and detection system shown generally as 10. An optical source 12 comprising a Ti:sapphire laser producing sub-100 femtosecond pulses at 800 nm is coupled to a precompensator 14. Although a Ti:sapphire laser is the preferred optical source 12 other short pulse sources may be used such as: a modelocked Er-doped fiber laser frequency doubled to produce pulses at 750–800 nm; a colliding- pulse modelocked (CPM) laser; an amplified Ti:sapphire laser consisting of a seed pulse that is amplified to higher energies; a frequency-doubled, modelocked Nd based glass laser; a modelocked laser based on any of the chromium doped hosts: LiCaF, LiSrAlF, or LiSrGaAlF; or any laser source producing femtosecond output pulses at megahertz repetition rates but is not limited to such.

In order to achieve a transform-limited pulse at the output of single mode optical fibers 18 and 19, a precompensator 14 adds dispersion of a sign opposite to the dispersion acquired in the fibers. Dispersion is the name given to the property of group velocity variation with wavelength. This will tend to spread, stretch, and/or distort an optical pulse shape, making it indistinct. The simplest form of dispersion comes from the propagation of light through bulk material. The source of this dispersion is the non-linear frequency-dependent index of refraction. It is one of the goals of the present invention to exactly or in the least closely reproduce the original optical pulse entering the optical fiber at the exit of the optical fiber.

The physical origin of the index of refraction and its consequent frequency-dependent nature are resonances in the material structure. Most optical materials have a strong resonant absorption in the ultraviolet portion of the spectrum and another in the mid infrared that leads to group velocity dispersion (GVD) being positive in the ultraviolet and visible portion of the spectrum and negative in the near-infrared portion of the spectrum. GVD is related to the second derivative of the index of refraction with respect to wavelength. Positive GVD is the condition where longer wavelength light packets will travel faster through the optical fiber than shorter wavelength light packets. Negative GVD is the opposite condition, shorter wavelength light packets will travel faster through the optical fiber than longer wavelength light packets. The preferred wavelength of the optical source generating the sub-100 femtosecond optical pulses is 600–900 nanometers. At these wavelengths the single mode optical fiber we will be using has positive GVD. To counteract the positive GVD of the optical fibers 18 and 19 a precompensator 14 having a negative GVD is incorporated into the system 10.

The precompensator 14 may consist of numerous embodiments having a negative GVD. The precompensator 14 may be comprised of prisms, gratings, grisms, Bragg-fiber gratings, Gires-Tournier interferometer, or any other combination thereof that results in a negative group-velocity dispersion system.

A prism pair is a dispersive device and may be used to provide negative GVD for an optical pulse. A prism disperses light because its geometry causes light of different wavelengths passing through it to separate and deviate by different amounts. Although the materials used to make prisms generally have positive dispersion it has been found that with proper ingenuity one can fashion a system that provides either positive or negative GVD. Making different portions of the pulse spectrum traverse different amounts of glass, thus effectively changing their relationship in the pulse does this.

Figure 2:
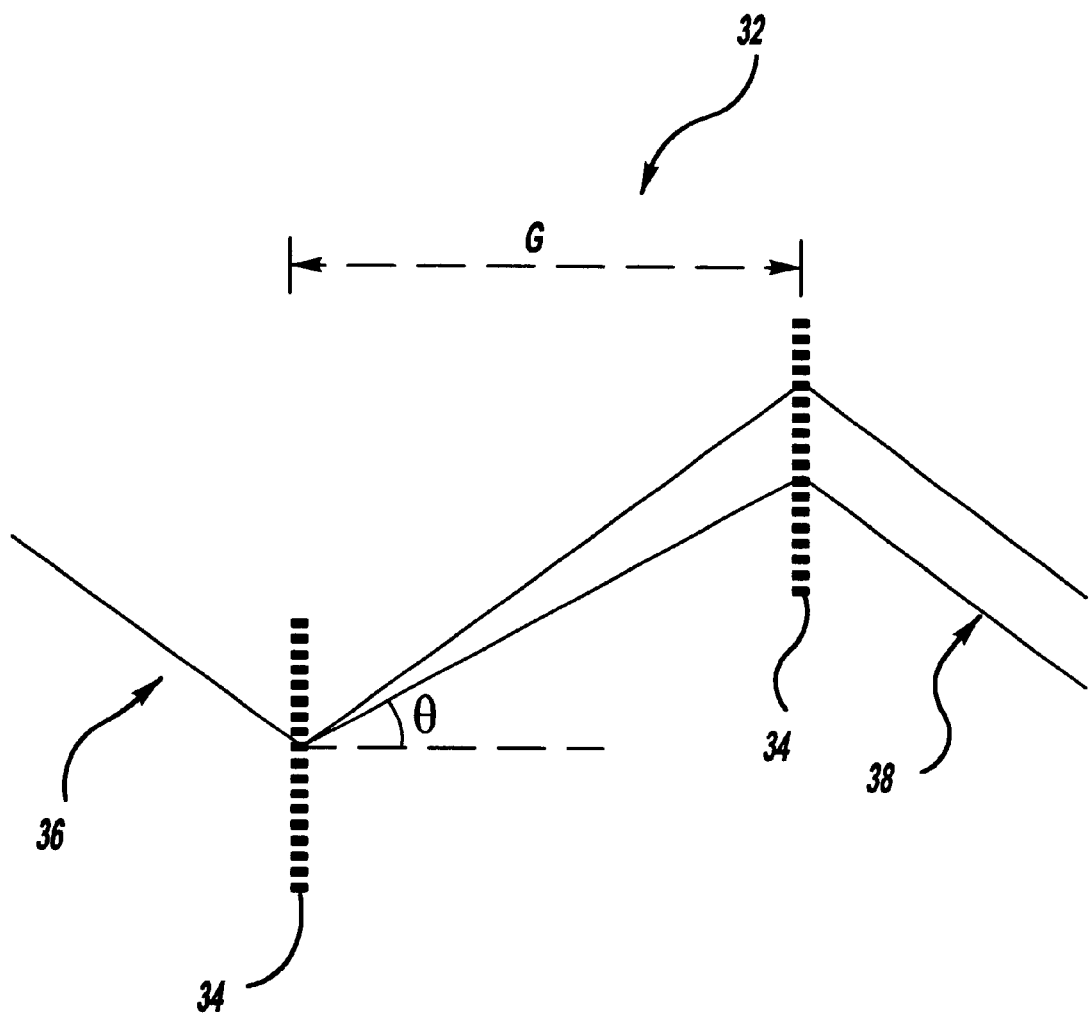
FIG. 2 is a diagrammatic view of a Treacy grating pair precompensator.

Diffraction grating systems are devices that may be used to add either negative or positive GVD to an optical pulse. We will concern ourselves only with those systems that provide negative GVD. A Treacy grating pair with parallel gratings 34 is shown generally as 32 in FIG. 2. Incident light 36 enters the grating pair and exits as negatively dispersed temporally and spatially distributed light 38. In a typical Treacy grating pair system the light 38 is retroreflected back on itself to double the dispersive power and recombine the laser beam. Its GVD may be defined as:

$$GVD = -\frac{\lambda^3 N^2 G}{\pi c^2 \cos^3 \theta}$$

where N is equal to the groove density, $\lambda$ is equal to the wavelength of light, G is equal to the distance between the gratings, and c is equal to the speed of light. Since all diffracted angles $\theta$ will be between $\pm 90°$ the GVD will be negative no matter what wavelength or grating is used. Transmission gratings are shown but reflection gratings will work in the same manner. Gratings of this type can be used to offset the positive GVD encountered in up to ten meters of optical fiber. The length of fiber is limited by the residual high-order dispersion that it caused by this style of grating system. This higher-order dispersion, typically referred to as third-order dispersion, causes the output pulse to be a distorted version of the input. The optimal Treacy grating pair is used at a Littrow input angle. This condition is met when the incident angle is equal to the diffracted (output) angle. Most gratings can achieve their highest efficiency at this angle.

Figure 3:
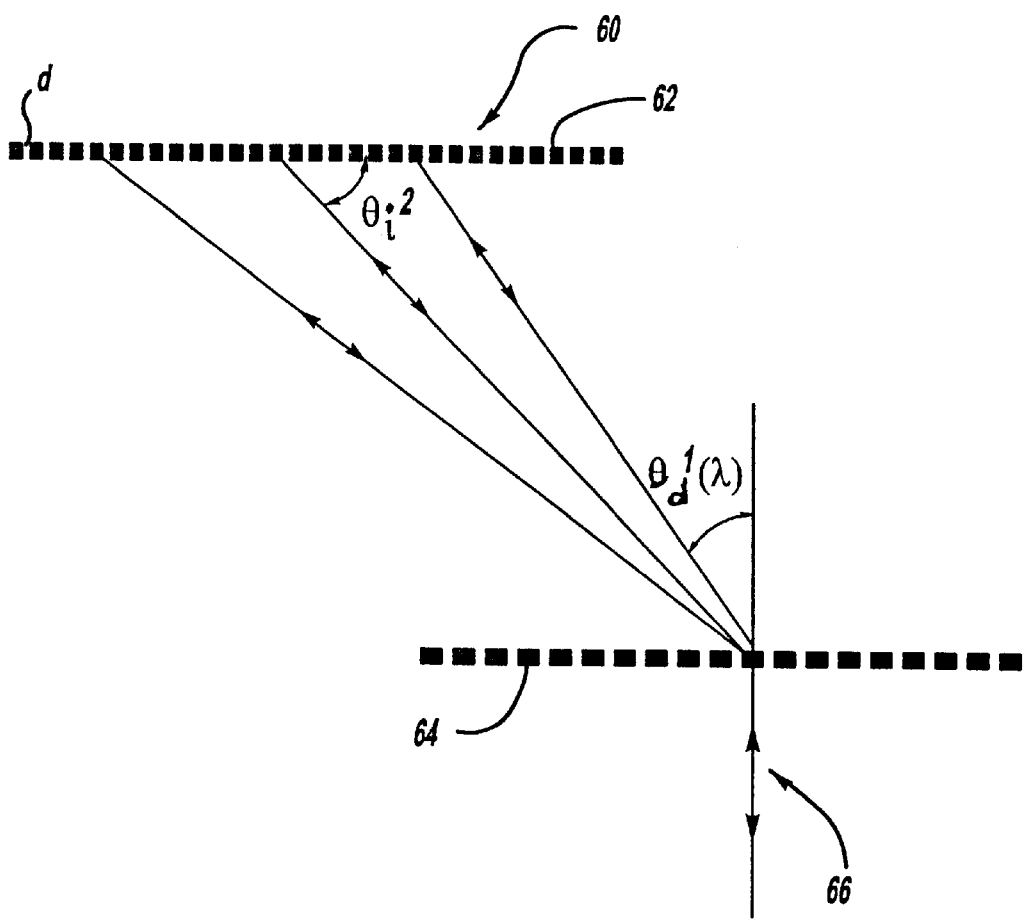
FIG. 3 is a diagrammatic view of a three-bounce grating precompensator.

A second grating design utilizing a first and second grating to introduce negative GVD on an optical pulse is shown generally as 60 in FIG. 3. The second grating 62 has a groove spacing d which is one-half of that of the first grating 64 (it's groove density is twice that of the first grating). Therefore, the second grating 62 can be made more efficient owing to its higher groove density. The second grating 62 is depicted as a reflection grating, though it could be a transmission grating. This system works when the incident light 66 hits the first grating 64 at normal incidence. The diffracted light from the first grating 64 obeys the equation:

$$\sin\theta_d^{(1)} = -\frac{\lambda}{d'}$$

and this diffracted angle $\theta^{(1)}{}_d$ becomes the incident angle on to the second grating:

$$\theta_i^{(2)} = \theta_d^{(1)}$$

The light diffracted from the second grating is governed by:

$$\sin\theta_d^{(2)} = -\frac{2\lambda}{d} + \sin\theta_i^{(2)}$$

which, after substitution, becomes:

$$\theta_d^{(2)} = -\theta_i^{(2)}$$

Therefore, every ray satisfies the Littrow condition where the input angle equals the output angle and diffracts back on top of itself. This compressor therefore requires only a total of three bounces off gratings 62 and 64 to generate the required GVD thus providing a more efficient method of compensating for positive GVD in a fiber. This system has the same amount of GVD and third order dispersion as a Treacy grating pair used at normal incidence as long as the groove density of the first grating 64 is the same as the groove density in the Treacy gratings 34. However, since the first grating must be used at normal incidence, this arrangement causes more $3^{rd}$-order dispersion for an equivalent amount of GVD as compared to a Treacy pair used at Littrow incidence angle.

Figure 4:
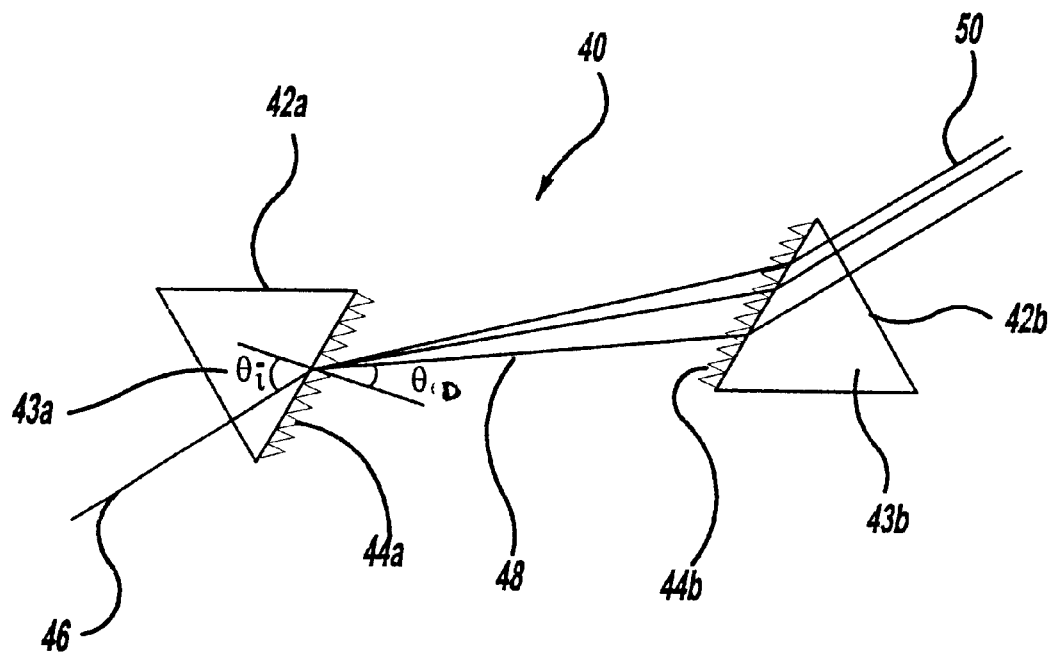
FIG. 4 is a diagrammatic view of a grism pair precompensator.

The preferred embodiment of the precompensator 14 is a grism pair shown generally as 40 in FIG. 4. A grism is a dispersive optical element that has physical characteristics of both a prism and a grating. The grisms 42a and 42b used in the present invention are comprised of prisms 43a and 43b with gratings 44a and 44b adjacent to the surfaces of the prism 43a and 43b. Dispersively, a grism acts like a grating with a high dielectric on one side. The equation for the GVD due to a grism is the same as for a regular grating pair. However, the angle θ has a different relationship with the input angle $θ_i$ given by the grating equation:

$$n \sin θ_i = m\lambda N + \sin θ_D$$

where n=index of refraction, λ=wavelength, N=groove density, and m=diffraction order (usually ±1). The advantage of the grism pair comes from the higher-order dispersive characteristics. In order to compensate properly for the dispersion introduced by a fiber one needs to compensate not only for GVD but also for the higher order dispersive terms. These higher-order terms can be ignored for short lengths of fiber (<10 meters), but start to dominate the pulse shape when trying to compensate the dispersion encountered in longer lengths of fiber. The grisms can be designed for such an application. In the present invention the grisms 42a and 42b are configured to generate a negative GVD and positive third order dispersion in order to compensate exactly for the optical fiber's positive GVD and negative third order dispersion. This is in contrast to the Treacy pair of gratings which generate negative GVD and negative third-order dispersion. Grisms with 1000 lines/mm, an index of refraction of 1.7, and an angle of incidence of 66.7° (λ=800 nm) may compensate for optical fibers up to a kilometer in length.

Referring to FIG. 4, the operation of the grism pair 40 is demonstrated. An incident light ray 46 travels through the first grism 42a and is diffracted. The diffracted beam 48 then travels through the second grism 44a and is recollimated. Due to the optical path length as a function of wavelength being nonlinear, the pair provides dispersion. In the present invention the light pulse 50 is then retroreflected back through the two grisms 42b and 42a and exits the grism pair 40 on the same path it entered in its original form 46. Once this light is separated from the input it is then focused into an optical fiber for transmission.

Figure 5:
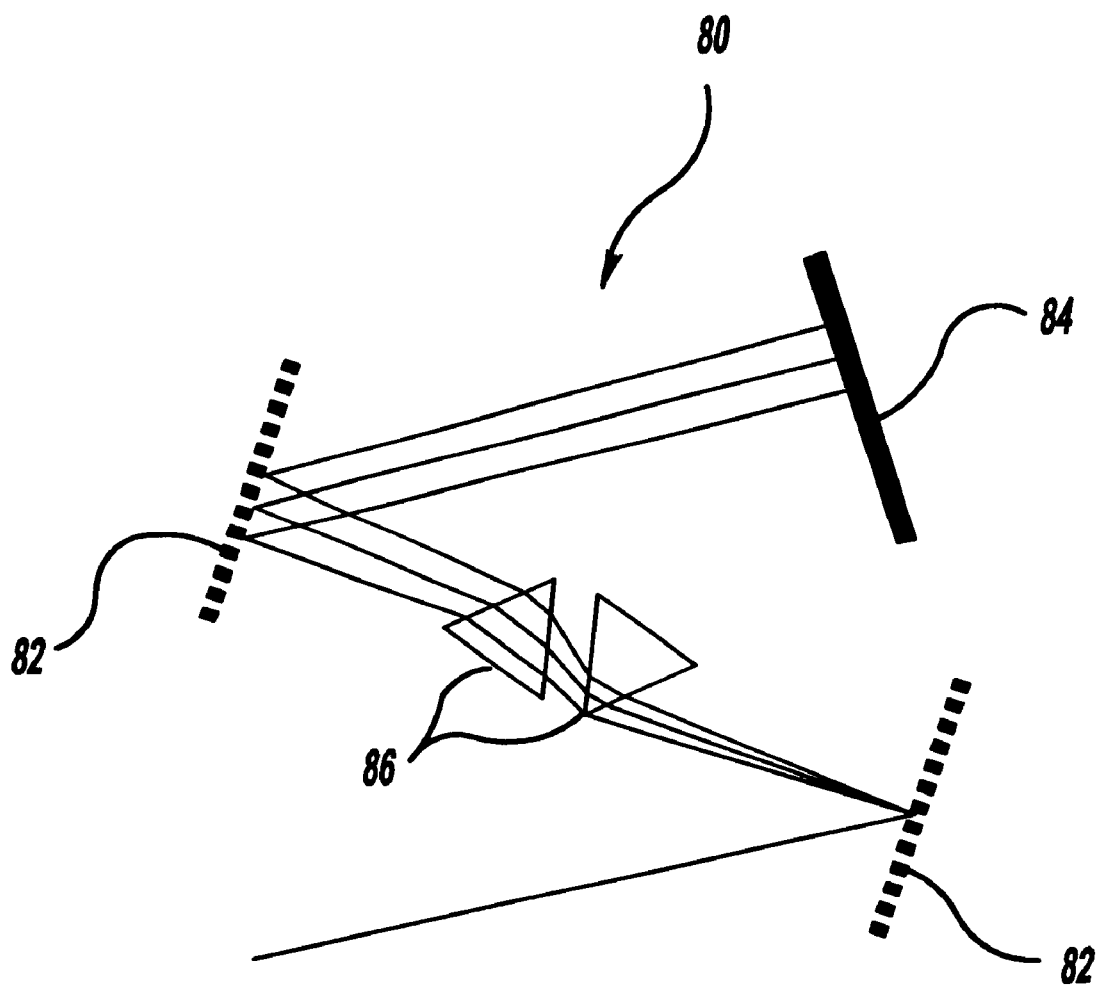
FIG. 5 is a diagrammatic view of a hybrid grating-prism pulse precompensator.

Additional negative dispersive elements may include a Gires-Tournois interferometer, hybrid grating-prism precompensator and a Bragg-Fiber grating system. A hybrid grating-prism precompensator generally shown as 80 in FIG. 5 is a combination of gratings 82, mirrors 84, and prisms 86. The dispersion of the hybrid system 80 can be modified by changing the characteristics of any of its components. In particular the third-order dispersion can be controlled independently of the GVD by adjusting the spacing of the prisms 86. A Bragg-Fiber grating utilizes a multilayer construct with varied depth grading between layers to reflect different wavelengths of light at different depths. Since specific wavelengths of light are reflected at only certain depths, these wavelengths of light will travel disparate distances creating both GVD and third-order dispersion. With proper construction Bragg-Fiber gratings are able to perfectly compensate for dispersion seen in long lengths of optical fiber.

The exact precompensation characteristics of any of the cited precompensation devices may be configured to match the dispersive characteristics of multiple fiber lengths and materials. For example, the spacing of the grating precompensation devices may be varied to change the dispersion of the gratings.

Referring to FIG. 1, after the optical pulse is stretched or precompensated by precompensator 14 and split by fiber splitter 15 it will enter optical fibers 18 and 19. Optical fibers 18 and 19 can comprise numerous commercially available single mode fibers. In the preferred embodiment optical fibers 18 and 19 with a length up to a thousand meters long can be compensated for. As the optical pulse exits the optical fiber 18 it will strike a terahertz transmitter, which will emit a single-cycle or half-cycle of electromagnetic radiation. The preferred embodiment employs a photoconductive element as the terahertz transmitter, generating electron-hole pairs and an impulse electrical current. The photoconductive element may be a pn-junction diode, pin photodiode, metal-semiconductor-metal photodiode, point-contact photodiode, heterojunction photodiode, or a simple semiconductor, which can be fabricated with any semiconductor element comprised of low temperature grown GaAs (LT-GaAs), Semi-insulating-GaAs, Silicon (crystalline or ion-implanted) on Sapphire (SOS), InP, InGaAs, or any other photoactive element but is not limited to such. The photoconductive element used to generate a terahertz pulse can also be of the kind outlined in U.S. Pat. No. 5,420,595 entitled "Microwave Radiation Source" which issued to Zhang et al. on May 30, 1995, and is incorporated by reference herein. The physics governing this latter style of device concerns both photoconductive and non-linear optical physics and is covered in the article by B. I. Greene, et al, "Far-Infrared Light Generation at Semiconductor Surfaces and Its Spectroscopic Applications," *IEEE J. Quantum Electron.*, vol. 28, pp. 2302–2312, 1992. This latter-style terahertz transmitter can work with either an externally applied electric field or an induced surface field due to the semiconductor-air interface. This style of internal field can also be due to a semiconductor-semiconductor or metal-semiconductor boundary. This induced field is perpendicular to the surface of the material, so that in order for any terahertz radiation to be radiated into free space, the incident optical pulse must strike the material at a non-zero incidence angle.

The optical pulse striking the photoconductive element will generate a current pulse. The variation in current will generate electromagnetic radiation. The temporal shape of the electromagnetic radiation is determined both by the shortness of the input optical pulse and the metal antenna structure that is coupled to the photoconductive element. In the preferred embodiment the antenna is in a dipole configuration. The antenna configuration for this preferred embodiment is outlined in U.S. Pat. No. 5,729,017, "Terahertz Generator and Detector" which issued to Brenner et al. on May 17, 1998, and is incorporated by reference herein. The radiation in the preferred mode will be from 50 gigahertz to 5 terahertz, but any electromagnetic frequency above or below this preferred range is possible.

Figure 6A:
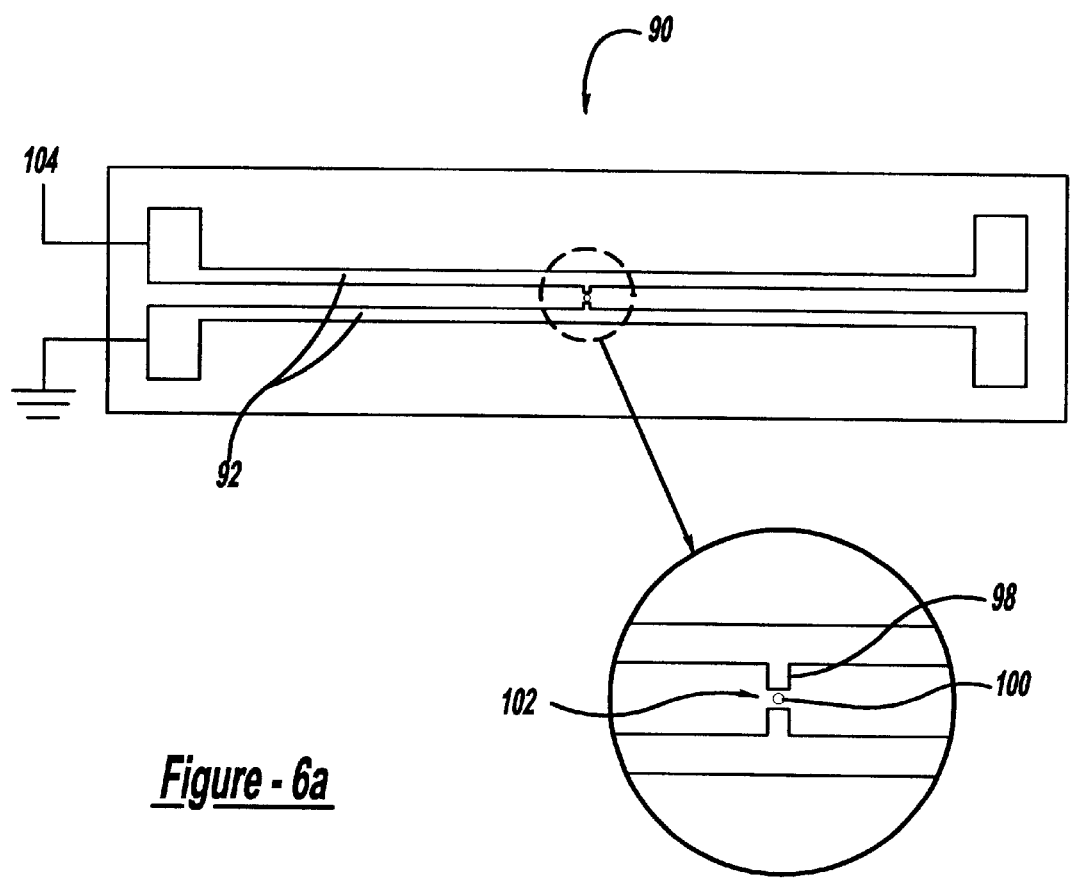
FIGS. 6a and 6b are diagrammatic views of the photoconductive elements used in one embodiment of the present invention.

An example of a transmitting element 90 having a photoconductive element is shown in FIG. 6a. A bias 104 is applied to a bias electrode 92 that is coupled to a dipole antenna 98. The dipole antenna 98 serves as the radiation emitter and the photoconductive gap at the center of the dipole antenna 98 is where carriers are generated. An ultrashort laser pulse in the femtosecond range will strike the focus spot 100 located in the gap 102 between the dipoles shorting the bias electrodes through the dipole antenna 98. The dipole antenna 98 thereby radiates electromagnetic energy in the terahertz range. Suitable electrodes can be made of 0.5 micron thick gold with linewidths from 1 micron to 100 microns separated by a gap of 5 to 100 $\mu$m depending on what wavelength radiation is preferred, although they are not limited to such.

As outlined in U.S. Pat. No. 5,710,430, "Method and Apparatus for Terahertz Imaging," which issued to Martin Nuss on Jan. 20, 1998, and is incorporated by reference herein, certain materials and objects can be characterized by a frequency-dependent absorption, dispersion, and/or reflection of terahertz transients which pass through, or reflect off, a sample. The electromagnetic radiation receiver 20 in FIG. 1 is configured to detect electromagnetic radiation in the terahertz range, after being conditioned by a sample. The receiver can be placed at any position surrounding a sample, so as to detect absorbed, reflected, refracted or scattered radiation. The electromagnetic radiation receiver 20 will then generate an electrical signal, which is interpreted, scaled, and/or digitized by any known data acquisition system. The receiver 20 is synchronized to the transmitter 16 by optical pulses traveling through optical fiber 19.

Figure 6B:
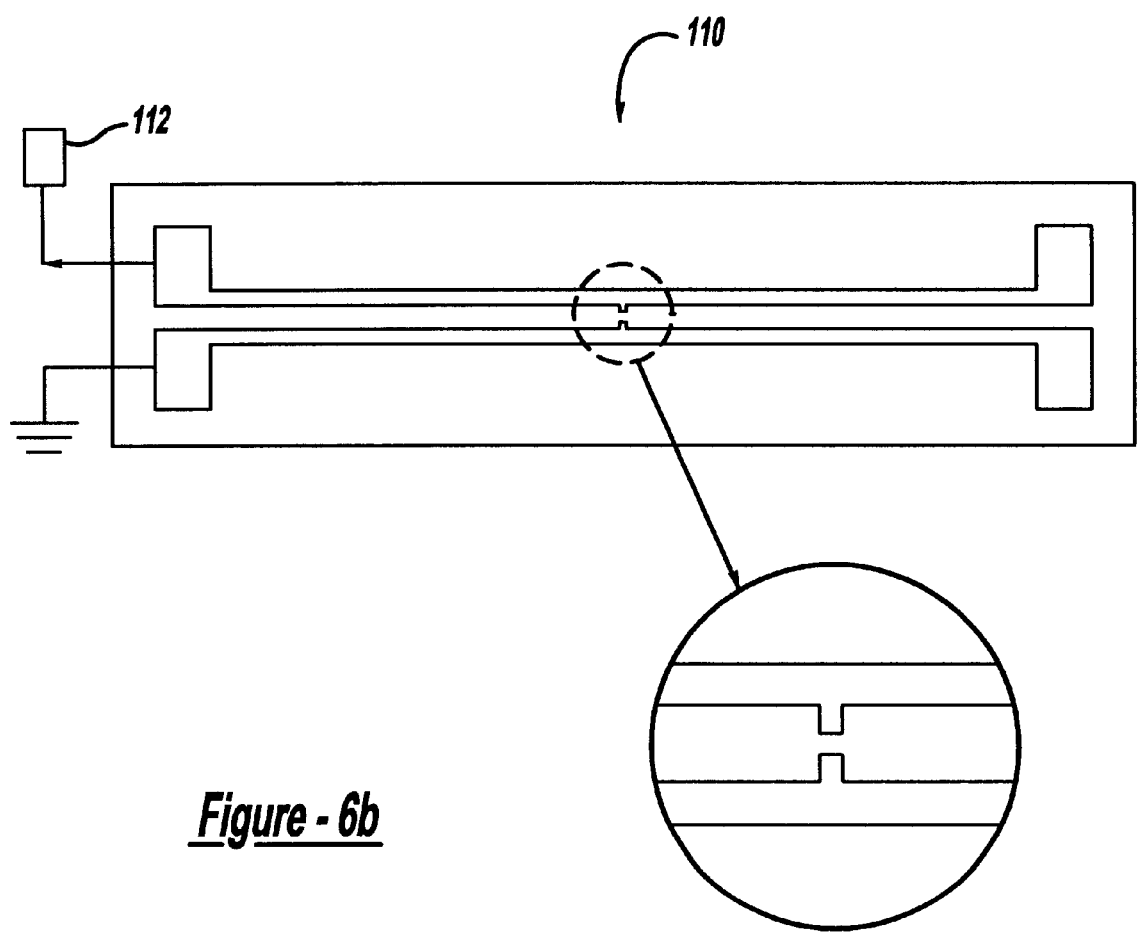

FIG. 6b is a diagrammatic drawing of the terahertz-receiving element 110. In the preferred embodiment, the terahertz-receiving element 110 is an identical structure to the transmitting element 90 except for the absence of a bias voltage. In other structures the material making up the receiver can be either photoconductive (LT-GaAs, SOS, LT-InGaAs) or electro-optic (ZnTe, GaP, LiNbO$_3$). The receiving element 110 is connected to an amplifier 112, which enables the received terahertz radiation to be examined.

It is to be understood that the invention is not limited to the exact construction illustrated and described above, but that various changes and modifications may be made without departing from the spirit and scope of the invention as defined in the following claims.

I claim:

1. A system for transmitting terahertz electromagnetic radiation, the system comprising:

an optical fiber for transmitting an optical pulse, wherein the optical pulse has a plurality of known original dimensions;

a precompensator in communication with the optical fiber for receiving the optical pulse and configured to provide a sufficient amount of dispersion to restore the plurality of known original dimensions that have been changed as the pulse propagates through the optical fiber; and a terahertz transmitter having an antenna, wherein the transmitter is in communication with the precompensator for detecting the optical pulse and generating the terahertz electromagnetic radiation.

2. The system of claim 1 further comprising a terahertz receiver for detecting the terahertz electromagnetic radiation transmitted by the terahertz transmitter.

3. The system of claim 1, wherein said precompensator is a prism pair.

4. The system of claim 1, wherein said precompensator is a grism pair.

5. The system of claim 1, wherein said precompensator is a three bounce grating system arrangement.

6. The system of claim 1, wherein said precompensator is a Treacy Grating pair.

7. The system of claim 1, wherein said precompensator is a Bragg-fiber grating.

8. The system of claim 1, wherein said optical fiber is a single mode fiber.

9. The system of claim 1, wherein said optical receiving means is a photoconductive element.

10. The system of claim 1, wherein said optical receiving means is an element that exhibits optical rectification.

11. The system of claim 1, wherein said antenna is a dipole antenna.

12. An optical distortion compensation apparatus comprising:

an optical fiber for transmitting an optical pulse, wherein the optical fiber positively disperses the optical pulse;

a precompensator in communication with the optical fiber for adding negative dispersion to the optical pulse to substantially eliminate the positive dispersion introduced by the optical fiber;

an optical switching means in communication with the precompensator and actuated by the optical pulse; and an electrical circuit coupled to the optical switching means for generating a terahertz electromagnetic radiation.

13. The optical distortion compensation apparatus of claim 12 further comprising a terahertz receiver for detecting the terahertz electromagnetic radiation transmitted by the electrical circuit.

14. The optical distortion compensation apparatus of claim 12, wherein said precompensator is a prism pair.

15. The optical distortion compensation apparatus of claim 12, wherein said precompensator is a grism pair.

16. The optical distortion compensation apparatus of claim 12, wherein said precompensator is a three bounce arrangement.

17. The optical distortion compensation apparatus of claim 12, wherein said precompensator is a Treacy grating pair.

18. The optical distortion compensation apparatus of claim 12, wherein said precompensator is a Bragg-fiber grating.

19. The optical distortion compensation of claim 12, wherein said optical fiber is a single mode fiber.

20. The optical distortion compensation of claim 12, wherein said optical switching means is a photoconductive element.

21. The optical distortion compensation apparatus of claim 12, wherein said optical switching means is an element that exhibits the inverse electro-optic or Franz-Keldysh effect.

22. An optical system comprising:

an optical fiber for transmitting an optical pulse, wherein the optical pulse has a plurality of original dimensions; and a grism pair coupled to the optical fiber for introducing dispersion of the optical pulse to compensate for dispersion caused by the optical fiber to substantially restore the optical pulse to the plurality of original dimensions; and an optical transmitter for detecting the optical pulse and generating terahertz electromagnetic radiation.

23. A method for compensating for distortion in an optical pulse caused by transmitting the optical pulse through an optical medium, the method comprising:

identifying an amount of dispersion created in the optical pulse by the optical medium;

transmitting the optical pulse through the optical medium;

introducing a sufficient amount of dispersion into the optical pulse to eliminate the dispersion caused by the optical medium to create a restored optical pulse;

receiving the restored optical pulse; and transmitting a terahertz electromagnetic radiation signal using an electric circuit excited by the restored optical pulse.

* * * * *